US007197556B1

(12) United States Patent
Short et al.

(10) Patent No.: US 7,197,556 B1
(45) Date of Patent: Mar. 27, 2007

(54) LOCATION-BASED IDENTIFICATION FOR USE IN A COMMUNICATIONS NETWORK

(75) Inventors: Joel E. Short, Los Angeles, CA (US); Mark F. Logan, Santa Monica, CA (US); Florence C. I. Pagan, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 467 days.

(21) Appl. No.: 09/693,511

(22) Filed: Oct. 20, 2000

Related U.S. Application Data

(60) Provisional application No. 60/161,093, filed on Oct. 22, 1999.

(51) Int. Cl.
*G06F 15/173* (2006.01)

(52) U.S. Cl. ..................................................... 709/224

(58) Field of Classification Search ......... 709/223–229
See application file for complete search history.

(56) References Cited

U.S. PATENT DOCUMENTS

| | | | | |
|---|---|---|---|---|
| 4,691,346 A | | 9/1987 | Vanacore | |
| 5,226,120 A | * | 7/1993 | Brown et al. ................ | 709/224 |
| 5,235,595 A | * | 8/1993 | O'Dowd .................... | 370/392 |
| 5,319,648 A | * | 6/1994 | Bux et al. ................... | 714/748 |
| 5,432,789 A | * | 7/1995 | Armstrong et al. ......... | 370/254 |
| 5,557,677 A | * | 9/1996 | Prytz .......................... | 380/212 |
| 5,651,058 A | | 7/1997 | Hackett-Jones et al. | |
| 5,740,171 A | * | 4/1998 | Mazzola et al. ............ | 370/392 |
| 5,742,604 A | * | 4/1998 | Edsall et al. ................ | 370/401 |
| 5,825,772 A | * | 10/1998 | Dobbins et al. ............ | 370/396 |
| 5,889,470 A | * | 3/1999 | Kaycee et al. .............. | 370/465 |
| 5,946,308 A | | 8/1999 | Dobbins et al. | |
| 6,041,057 A | * | 3/2000 | Stone .......................... | 370/397 |
| 6,058,429 A | * | 5/2000 | Ames et al. ................ | 709/242 |
| 6,061,334 A | * | 5/2000 | Berlovitch et al. ......... | 370/255 |
| 6,075,776 A | * | 6/2000 | Tanimoto et al. ........... | 370/254 |

(Continued)

FOREIGN PATENT DOCUMENTS

WO          WO 98/36587          8/1998

OTHER PUBLICATIONS

Denning et al., Location-Based Authentication: Grounding Cyberspace for Better Security, copy right 1996, Elsevier Science Ltd., pp. 1-6.*

*Primary Examiner*—Jason Cardone
*Assistant Examiner*—Thomas Duong
(74) *Attorney, Agent, or Firm*—Alston & Bird LLP

(57) ABSTRACT

A method and apparatus for implementing location-based identification in a communication network. The method comprises establishing a network connection between a host and a network, transmitting network data packets from the host through a connection port, transmitting data packets from the host through a location-specific connection port and identifying the port at an access concentrator in the form of a port identifier. The port identifier is then communicated to a network device, typically a gateway device, and stored in a database in communication with the network device. The method may include tagging the network packets at the access concentrator with a port identifier that corresponds to a media access control (MAC) address. The access concentrator and the network device will tag and communicate port numbers by assigning VLAN (Virtual Local Area Network) identifiers to the ports.

20 Claims, 8 Drawing Sheets

U.S. PATENT DOCUMENTS

| | | | |
|---|---|---|---|
| 6,147,995 A * | 11/2000 | Dobbins et al. | 370/392 |
| 6,167,445 A * | 12/2000 | Gai et al. | 709/223 |
| 6,175,867 B1 * | 1/2001 | Taghadoss | 709/223 |
| 6,181,699 B1 * | 1/2001 | Crinion et al. | 370/392 |
| 6,208,977 B1 * | 3/2001 | Hernandez et al. | 705/34 |
| 6,286,038 B1 * | 9/2001 | Reichmeyer et al. | 709/220 |
| 6,331,983 B1 * | 12/2001 | Haggerty et al. | 370/400 |
| 6,339,595 B1 * | 1/2002 | Rekhter et al. | 370/392 |
| 6,370,142 B1 * | 4/2002 | Pitcher et al. | 370/390 |
| 6,424,659 B2 * | 7/2002 | Viswanadham et al. | 370/469 |
| 6,430,621 B1 * | 8/2002 | Srikanth et al. | 709/238 |
| 6,460,084 B1 * | 10/2002 | Van Horne et al. | 709/227 |
| 6,463,478 B1 * | 10/2002 | Lau et al. | 709/236 |
| 6,470,385 B1 * | 10/2002 | Nakashima et al. | 709/224 |
| 6,526,052 B1 * | 2/2003 | Rijhsinghani et al. | 370/389 |
| 6,526,056 B1 * | 2/2003 | Rekhter et al. | 370/392 |
| 6,539,422 B1 * | 3/2003 | Hunt et al. | 709/217 |
| 6,549,516 B1 * | 4/2003 | Albert et al. | 370/236 |
| 6,597,693 B1 * | 7/2003 | Leung | 370/386 |
| 6,728,920 B1 * | 4/2004 | Ebersman | 714/752 |
| 6,775,290 B1 * | 8/2004 | Merchant et al. | 370/395.53 |

\* cited by examiner

LOCATION-BASED IDENTIFICATION FOR USE IN A COMMUNICATIONS NETWORK

CROSS-REFERENCE TO RELATED APPLICATIONS

The present application claims priority from U.S. Provisional Patent Application Ser. No. 60/161,093, filed Oct. 22, 1999, the contents of which are incorporated by reference.

FIELD OF THE INVENTION

The present invention relates generally to an identification process within a communications network and, more particularly, to a method and apparatus for implementing location-based identification in a communications network.

BACKGROUND OF THE INVENTION

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy.

A universal subscriber gateway device has been developed by Nomadix, L.L.C. of Westlake Village, Calif. and is described in detail in U.S. patent application Ser. No. 08/816,174, entitled "Nomadic Router", filed on Mar. 12, 1997, in the name of inventors Short et. al.; Ser. No. 09/458,602, entitled "Systems and Methods for Authorizing, Authenticating and Accounting Users Having Transparent Computer Access to a Network Using a Gateway Device", filed on Dec. 8, 1999, in the name of inventors Pagan et. al.; and Ser. No. 09/458,569, entitled "Systems and Methods for Redirecting Users Having Transparent Computer Access to a Network Using a Gateway Device Having Redirection Capability" filed on Dec. 8, 1999, in the name of inventors Short et. al. These applications have been assigned to the same assignee as the present invention and the contents of these applications are expressly incorporated herein by reference as if setforth fully herein.

The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to the protocols and other parameters of the host, in order that it may communicate with the new network in a manner that is transparent both to the user/subscriber and the new network. Once the gateway device has appropriately adapted to the user's host, the host can appropriately communicate via the new network, such as the network at a hotel, at home, at an airport, or any other location, in order to access other networks, such as the enterprise network, or other online services, such as the internet.

The portable computer user/subscriber, and more specifically the remote or laptop user, benefits from being able to access a myriad of communication networks without having to undergo the time-consuming and all-too-often daunting task of reconfiguring their host in accordance with network specific configurations. From another perspective, the network service provider benefits from avoiding "on-site" visits and/or technical support calls from the user who is unable to properly re-configure the portable computer. In this fashion, the gateway device is capable of providing more efficient network access and network maintenance to the user/subscriber and the network operator.

Gateway devices are typically used to provide network access to the remote portable computer user, such as users in hotels, airports and other locations where the remote portable computer user may reside. Additionally, gateway devices have found wide-spread use in multi-resident dwellings as a means of providing the residents an intranet that networks the residents, broadband Internet access capabilities and the capacity to adapt to the variances of the resident's individual enterprise network needs. With the advent of even smaller portable computing devices, such as handhelds, PDAs, and the like, the locations where these users may reside becomes almost limitless. Someday we can envision wireless communications technology providing the capability to offer networking to all forms of land and air passengers. Gateway devices will likely provide the impetus for granting remote network access to all remote users communicating through wireless links and other foreseeable communication mediums.

In most of the remote user applications and the multi-resident dwelling applications, the gateway administrator (i.e. the network service provider) is not so much concerned with "who" the user/subscriber is, but rather, "where" the user resides or is located. Location based information is imperative to the network service provider who desires to manage and bill subscribers based on where they are physically located rather than who they are or what host they may choose to use. For example, in the hotel scenario, the network service provider is more concerned with knowing that Room 301 has a seven day network subscription than knowing who the individual users are that are residing in Room 301. In this manner, the gateway administrator is able to provide Room 301, as opposed to individual residents in Room 301, with a location identifier. The gateway administrator or network provider relies on this information for ensuring accurate subscriber billing.

Additionally, the gateway administrator may benefit from location-based identification in the area of network management. For instance, by classifying within the network databases according to location the gateway device is able to provide network options to subscribers based upon where they are located. By way of example, if the gateway device has "learned" through location identification that Room 301 is a suite, thereby affording its customers additional service privileges, the gateway device can provide these additional service privileges without the need to query the user/subscriber regarding suite status. The same type of location classification can be beneficial in the multiple-resident dwelling example (i.e. a specially classified building or wing), in the airport example (i.e. a specially designated network port area for first class travelers) or in any other network application that uses a gateway device to provide network access and network adaptation.

SUMMARY OF THE INVENTION

The present invention comprises a method and apparatus for implementing location-based identification in a communication network.

In one embodiment of the present invention a method for implementing location-based identification in a communication network comprises establishing a network connection between a host and a network, transmitting data packets from the host through a location-specific connection port and identifying the port at an access concentrator in the form of a port identifier. The port identifier is then communicated to a network device, typically a gateway device, and stored in a database in communication with the network device.

In another embodiment of the method for location-based identification the process of identifying the port at an access concentrator further includes tagging the network packets at the access concentrator with a port identifier that corresponds to a media access control (MAC) address. The access concentrator and the network device will tag and communicate port numbers by assigning VLAN (Virtual Local Area Network) identifiers to the ports.

In a further embodiment of the method for implementing location-based identification the process of identifying the port at an access concentrator further includes transmitting a port identifying query from a network device, typically a gateway device, to an access concentrator and sending a port identifying response from the access concentrator to the network device. The network device and the access concentrator will have corresponding agents configured to send and respond to queries. For example the gateway device and access concentrator may incorporate an SNMP agent or an XML agent to communicate via queries.

In another embodiment of the invention a network apparatus is defined that is capable of communicating with an access concentrator to determine the port identity corresponding to the received MAC address. The gateway device is then able to use the location-based identities to structure billing schemes and manage the overall network that the service provider has established.

The invention is further defined in a method for using location-based identification in a communications system. A network device, typically a gateway device accesses a database to determine the identification status of connection ports within a communications network. The identification status of the connection ports are then used to execute a network system application such as billing, authentication or any other network management application.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
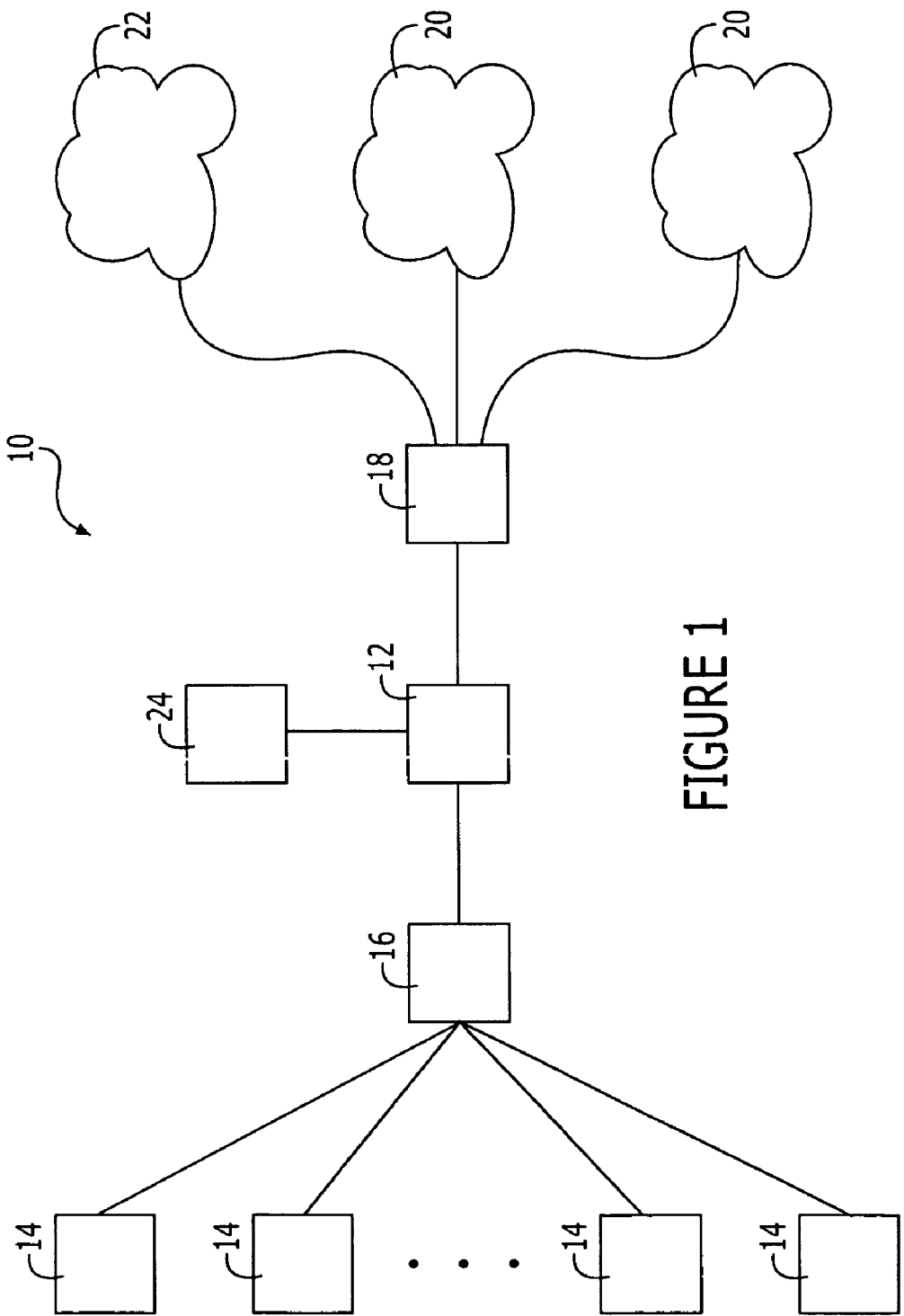
FIG. 1 is a block diagram of a communication system that includes a gateway device for automatically configuring one or more hosts to communicate via the gateway device with other networks or other online services.

Referring now to FIG. 1, a network system 10 that includes a gateway device 12 is depicted in block diagram form. The network system typically includes a plurality of computers/hosts 14 that access the system in order to gain access to networks or other online services. For example, the hosts can be in communication with ports that are located in different rooms of a hotel or a multi-dwelling residence. Alternatively, the hosts can be in communication with ports in an airport, an arena, or the like. The network system also includes a gateway device that provides an interface between the plurality of hosts and the various networks or other online services. Most commonly, the gateway device is located proximate the hosts at a relatively low position in the structure of the overall network system. (i.e. the gateway device will be located within the hotel, multi-unit residence, airport, etc.) However, the gateway device can be located at a higher position in the overall network system such as at a Point of Presence (PoP) or a Network Operating Center (NOC), if so desired.

Although the gateway device can be physically embodied in many different fashions, the gateway device typically includes a controller and a memory device in which commands are stored that define the operational characteristics of the gateway device. Alternatively, the gateway device can be embedded within another network device, such as an access concentrator or a router, or the commands that define the functioning of the gateway device can be stored on a PCMCIA card that can be executed by one or more hosts in order to automatically reconfigure the host(s) to communicate with a different network.

The network system 10 also typically includes an access concentrator 16 positioned between the hosts 14 and the gateway device 12 for multiplexing the signals received from the plurality of communications onto a link to the gateway device. Depending upon the medium by which the hosts are connected to the access concentrator, the access concentrator can be configured in different manners. For example, the access concentrator can be a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like. As also shown in FIG. 1, the network system typically includes one or more routers 18 and/or servers (not shown in FIG. 1) in communication with a plurality of networks 20 or other online services 22. While the network system is depicted to have a single router, the network system will typically have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to adapt to the configuration of each of the hosts 14 that log onto the network system 10 in a manner that is transparent to the subscriber and the network. In the typical network system that employs dynamic host configuration protocol (DHCP) service, an IP address is assigned to the host that is logging onto the network through communication with the gateway device. The DHCP service can be provided by an external DHCP server 24 or it can be provided by an internal DHCP service located within the gateway device. Upon opening their web browser or otherwise attempting to access an on-line service, the gateway device will direct the subscriber to enter some form of an identifier such as their ID and password. In an alternate embodiment of the device, it is anticipated that the gateway device will be able to automatically detect this information upon connection of the host to the network or any attempt to log in. The gateway device then determines if the subscriber is entitled to access the communication system, the level of access and/or the type of services to which the subscriber is entitled according to an Authentication, Authorization and Accounting (AAA) procedure that is described by U.S. patent application Ser. Nos. 08/816,174, 09/458,602 and 09/458,569, previously incorporated by reference. An AAA service, which is a database of subscriber records, may be an AAA server remote to the gateway device or the AAA service may comprise a database incorporated into the physical embodiment housing the gateway device.

Assuming that the subscriber has been authenticated and has authorization, the gateway device typically presents subscribers with a home page or control panel that identifies, among other things, the online services or other communication networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the network system will come at a cost, such that the gateway administrator will charge the subscriber a higher rate for their service. For example, a subscriber may elect to increase the transfer rate at which signals are transmitted across the communication network and pay a correspondingly higher price for the expedited service.

The home page also permits the subscriber to select the network 20 or other online services 22 that the subscriber wishes to access. For example, the subscriber can access the enterprise network on which the host is typically resident. Alternatively, the subscriber can access the internet or other on-line services. Once the subscriber elects to access a network or other online service, the gateway device establishes appropriate links via one or more routers 18 to the desired network or online service.

Thereafter, the subscriber can communicate freely with the desired network 20 or other online service 22. In order to support this communication, the gateway device 12 generally performs a packet translation function that is transparent to the user/subscriber and the network. In this regard, for outbound traffic from the host 12 to the communication network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the accessed network or other online service that is routed through the gateway device, undergoes a translation function at the gateway device so that the packets are properly formatted for the user/subscriber's host. In this manner, the packet translation process that takes place at the gateway device is transparent to the host, which appears to send and receive data directly from the accessed communication network. Additional information regarding the translation function is provided by U.S. patent application Ser. No. 08/816,714. By implementing the gateway device as an interface between the user/subscriber and the communication network or other online service, however, the user/subscriber will eliminate the need to re-configure their host 12 upon accessing subsequent networks.

In one embodiment of the present invention, the gateway device implements location-based identification. In accordance with the present invention location-based identification may also be embedded within another network device, such as an access concentrator or a router, or the commands that define location-based identification can be stored on a PCMCIA card that can be executed by one or more hosts in order to identify the ports from which the hosts access the network system. Location based identification allows the network system to grant network access to a specific location (e.g. a hotel room, a specific apartment address, etc.) rather than a specific user or host residing at the location. Basing identification on location, as opposed to user or host, allows the gateway administrator (i.e. network service provider) to manage the network system according to user locations and to provide for a billing scheme according to user locations. For an example of a network management system that utilizes location based management in a gateway device environment see United States Patent Application No. 60/160,973 entitled "Systems and Methods for Enabling Network Gateway Devices to Communicate with Management Systems to Facilitate Subscriber Management" filed on Oct. 20, 2000 in the name of inventors Short et. al. and assigned to the same assignee as the present invention. That application is herein expressly incorporated by reference as if setforth fully herein.

In one embodiment of the present invention the gateway device includes a processor that communicates with an access concentrator to determine connection ports of host-generated data packets. Once the connection ports are determined they are stored within a database, such as a connection table, that is in communication with the gateway device processor. In a typical gateway device the processor will employ the use of VLAN protocol as the communication link between the gateway device and the access concentrator. While VLAN is by definition, Virtual Local Area Network, in the context we are concerned with VLAN is the IEEE-standard protocol 802.1 Q used to implement VLAN. VLAN technology is well known in the art and has been used to create virtual networks by employing VLAN processors between network interfaces to logically bridge networks together. VLAN works on the concept of tracking ports by tagging the IP packet with an identifier. By using VLAN technology, the gateway device can provision subscriber access to the network on a localized port basis. For example, in a multi-resident dwelling environment, a network service provider may want to provision Internet access to individual units or apartments; each unit is assigned a VLAN ID (a port-location tag). In this example, a resident within the unit can choose to subscribe to the service and the gateway device will then allow Internet access from the resident's unit, regardless of which host or who the user is within the unit. Typically, hosts are granted network access via a MAC (Media Access Control) address that connects the device to a shared network medium. The use of VLAN tagging overrides the MAC address identification process.

VLAN ports can be "tagged" at any level, for example, a specific room in a hotel or an apartment building can be assigned a tag, or a floor within a building, a wing within a building or the building itself may be assigned an individual tag. Alternatively, multiple ports may be tagged to a single room. The gateway device uses a port-location authorization table to manage the assigned ports and ensure accurate billing for services used by a particular port.

Figure 2:
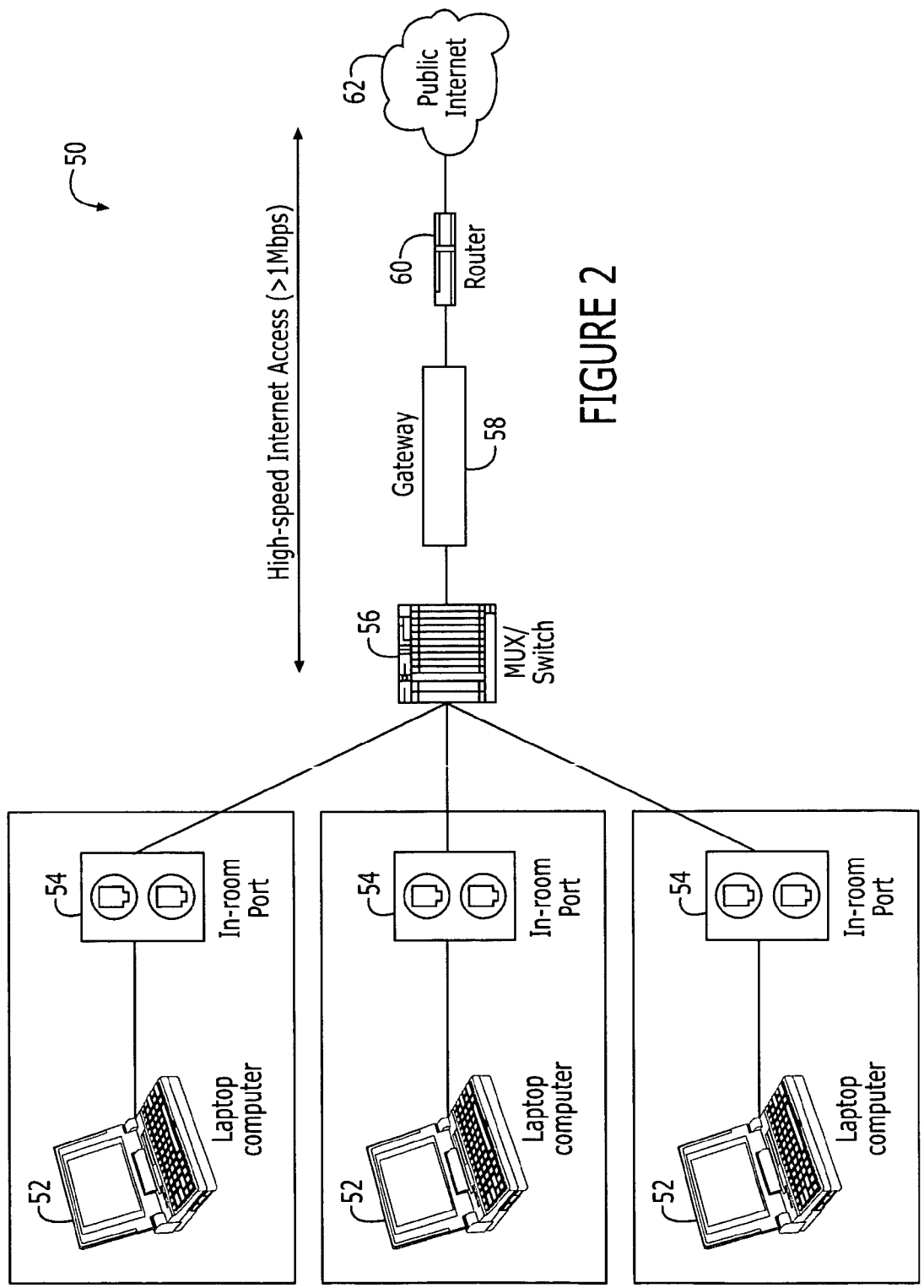
FIG. 2 is a block diagram of a simplified communication network configured so as to allow for location-based identification, in accordance with an embodiment of the present invention.

FIG. 2 illustrates a simplified network system 50 configured so as to allow for location-based identification supported by VLAN tagging. A series of portable computers/hosts 52 are located within separate entities. The separate entities may include apartment units, hotel rooms, airport kiosks, retail outlets or the like. The user (not shown in FIG. 2) connects to the network service provider via a port 54 in the room. The communication between the host and the port may be physical; such as cable to connector, or the communication may be wireless. A modem (not shown in FIG. 1), either internal within the hosts or external, may be required to provide access to the network service provider. The medium used to establish the connection may include standard telephone dial-in, cable, CAT5 high quality cable, DSL (Digital Subscriber Line), wireless or any other applicable connection medium.

Once the host establishes connections it begins sending out standard IP (Internet Protocol) packets. An access concentrator 56 initially receives the IP packets. The access concentrator serves as a switch that multiplexes signals received from numerous ports and sends them out one output port. Depending upon the medium by which the hosts are networked to the access concentrator, the access concentrator can be configured in different manners. For example, the access concentrator can be a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like. For VLAN tagging to be implemented the access concentrator must be able to support VLAN technology. If the access concentrator does not support VLAN tagging or a similar tagging means then location-based identification may be implemented by the alternative SNMP (Simple Network Management Protocol) query embodiment of the present invention that is detailed in later discussion herein. Access concentrators are well known by those of ordinary skill in the art and most DSLAMs or other access concentrators will support VLAN technology.

In the VLAN tagging embodiment of the present invention once the access concentrator receives the IP packet it knows what host sent it (from the MAC address header) but it does not know where the host is located. The access concentrator through the use of a VLAN processor has the capability to "know" from what port each packet arrived. It then re-configures the packet by adding a header, typically between the Ethernet and IP portions of the packet according to the 802.1 Q IEEE VLAN protocol, identifying the port number and the host. These packets are then forwarded via the single output to the gateway device 58. The gateway device removes the port information and records the data in a database, such as a connection table. A typical connection table maps a port identifier to a MAC address for all incoming packets routed from the access concentrator. The dynamic nature of the table would allow for the subscriber to change locations and access the network system through an alternate port that has been identified and authorized for use. Once the port number is recorded the VLAN portion is stripped from the packet header and the packet is forwarded on to a router 60 and subsequently the Internet 62 or another network in the system. The VLAN tag may be placed back on a packet that is being communicated from the network to the host so that the access concentrator knows where the packet is to be sent. Additionally, tagging packets coming from the network back to the subscriber provides the gateway device to be interoperable with most access concentrators that are in VLAN tagging mode. This allows for the access concentrators that comprise a composite communication network to communicate in "trunked" line fashion.

It should be noted that while other devices in the network system may communicate in VLAN protocol, in this embodiment the only two devices that require VLAN protocol communication are the access concentrator and the gateway device. The host devices are generally incapable of communicating in VLAN and the downstream network components (routers, switches, bridges, etc.) are inconsequential in this regard.

Figure 3:
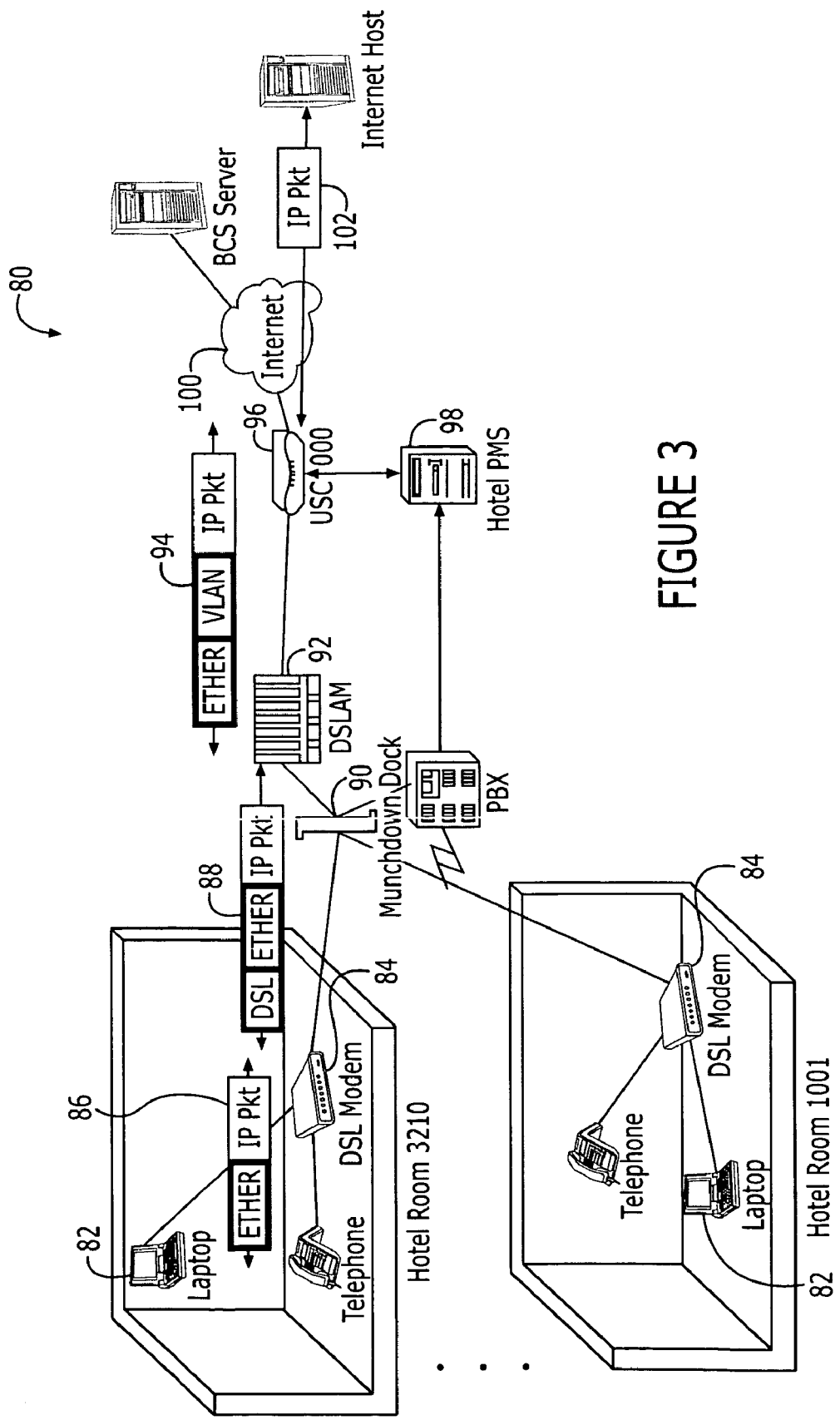
FIG. 3 is a block diagram of a communication network using DSL as the communication medium and implementing VLAN tagging to incorporate location-based identification, in accordance with an embodiment of the present invention.

FIG. 3 is a block diagram that illustrates a network configuration using DSL as the communication medium and VLAN tagging as a means of incorporating location-based identification. This networking configuration is shown by way of example, and other communication medium, such as cable, wireless or the like, may also be used to configure a network using VLAN tagging to incorporate location-based identification. The network system 80 includes hosts 82, typically portable computers and in this illustration conventional laptop computers. The hosts in this example are located in individual hotel rooms, however the hosts could be located in other entities, such as apartment units, office rooms, airport kiosks or the like. The hosts access the network via a digital subscriber line (DSL) modem 84. Once a communication link is established the hosts send out standard IP packets 86 to communicate data within the network. At the DSL modem a DSL header is attached to the packets, resulting in the DSL/Ethernet/IP packet 88. The DSL header serves to identify the DSL modem or the port. The packets are then routed through a connection point, shown in this example as punchdown block 90, before an access concentrator 92 receives them.

Figure 4:
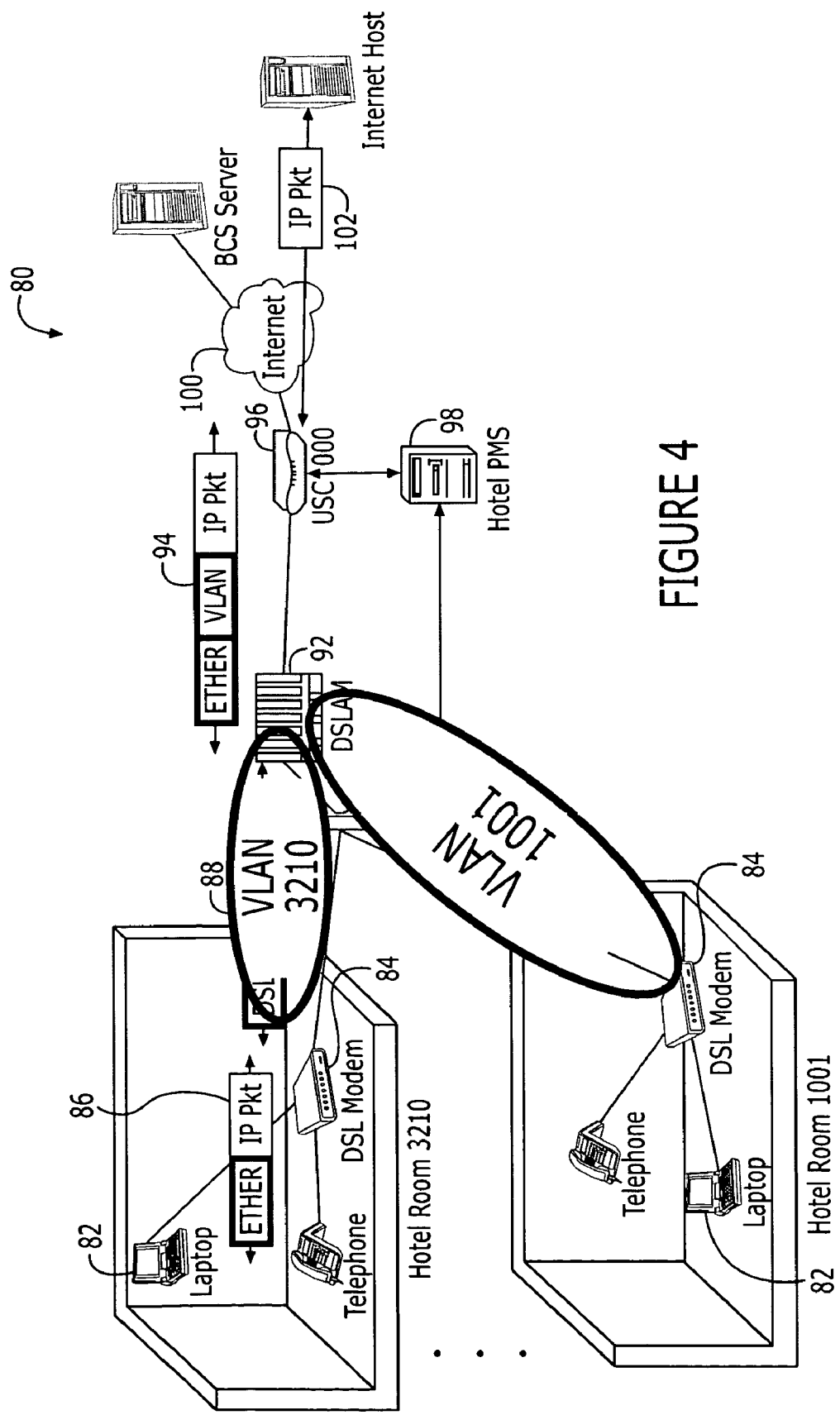
FIG. 4 is a block diagram of a communication network highlighting the unique VLAN identification feature of VLAN tagging, in accordance with an embodiment of the present invention.

In this embodiment the access concentrator is a DSLAM that is capable of communicating in VLAN (IEEE 802.1 Q) protocol. The access concentrator determines the port from which the packet was sent and assigns an appropriate VLAN identification number to the packet based upon the port from which it was sent. As shown in FIG. 4 each port, in this example each hotel room has a unique VLAN ID. For example, hotel room 3210 may be assigned VLAN ID 3210 and hotel room 1001 may be assigned VLAN ID 1001. A table within the access concentrator maps VLAN IDs to the associated room number, kiosk number, etc. A VLAN header is added to the packet, resulting in the Ethernet over VLAN over IP packet 94 shown in FIG. 4. These packets are then communicated to the gateway device 96 where the VLAN portion of the header is removed and the VLAN ID is referenced to a specific port within a communications table database associated with the gateway device. In turn, the gateway device may use this location-based identification for billing purposes, such as the Hotel PMS system 98 shown in FIG. 4, network authorization or other network purposes. After the gateway device has logged the port related information the packets are communicated forward to other networks, such as the Internet 100. In this instance the packets are communicated as standard IP packets 102.

It should be noted that the gateway device or any other network device implementing location-based identification will require configuration upon initial installation to accommodate location-based identification. If VLAN tagging is to be the basis for location-based identification the gateway device or similar network device must be configured to allow for this communication to occur. A gateway administrator will need to configure the gateway so that VLAN ID's are assigned to individual entities or ports (i.e. room numbers, apartment units, etc.). Port location assignments can be added, updated or deleted according to gateway administrator commands. Adding a port-assignment to the gateway device database may involve assigning a port number, assigning a location to the port number and a conditional state for this port-location. Conditional states may be associated with billing schemes. For instance portlocations may be assigned a "no charge" state, a "charge for use" state, a "blocked" state or any other state may be assigned.

Figure 5:
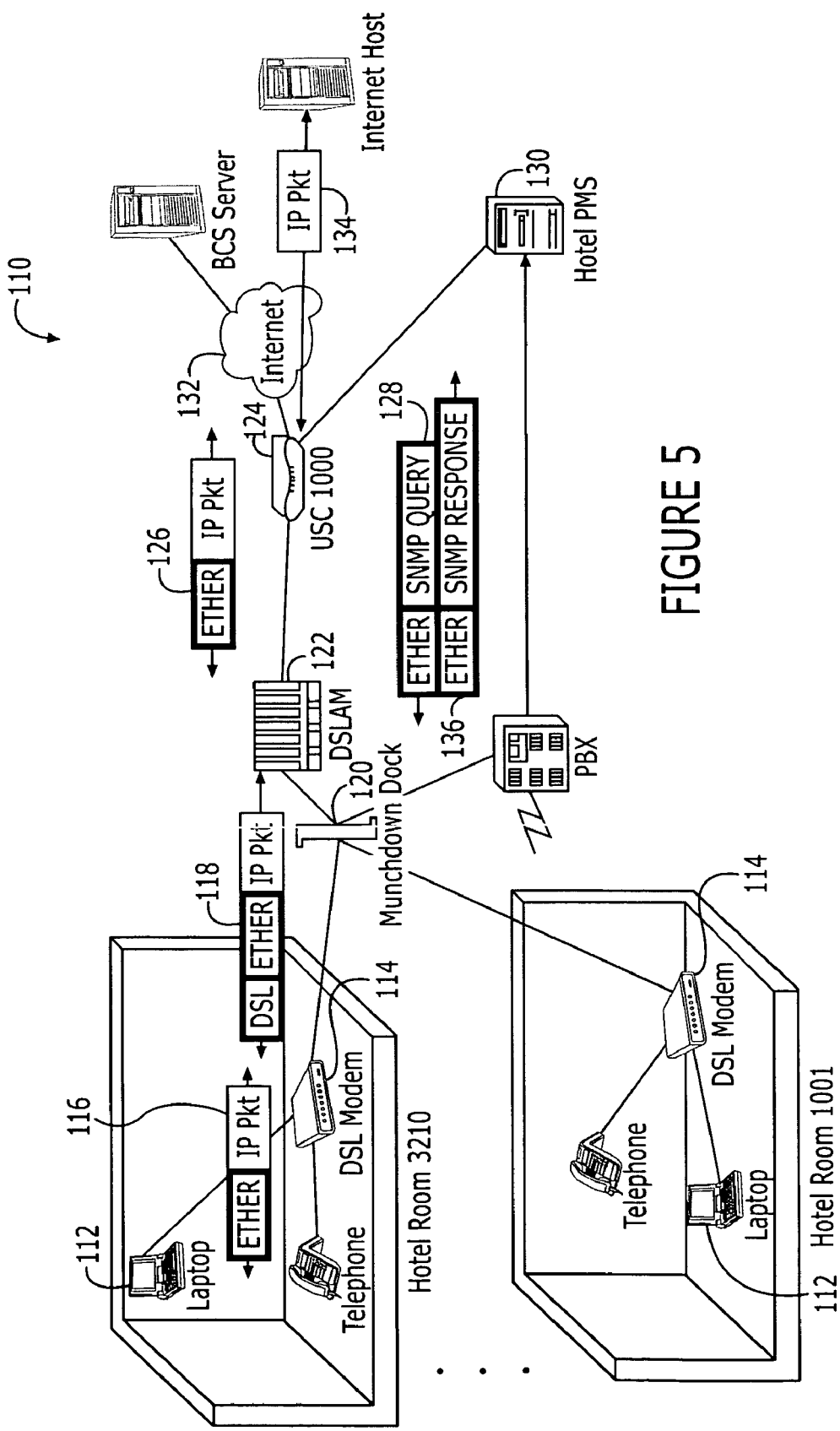
FIG. 5 is a block diagram of a communication network using DSL as the communication medium and implementing SNMP querying to incorporate location-based identification, in accordance with an embodiment of the present invention.

In another embodiment of the present invention the location-based identification is implemented by the processor within a gateway device using a query agent capable of requesting identification data related to the connection port of host-generated data packets. A typical gateway processor will implement SNMP (Simple Network Management Protocol) querying or a similar querying agent may be implemented. The SNMP query embodiment is generally used if the access concentrator does not support the VLAN protocol. FIG. 5 is a block diagram that illustrates a network configuration using DSL as the communication medium and SNMP queries as a means of incorporating location-based identification. This networking configuration is shown by way of example, other communication medium, such as cable, wireless or the like, may also be used to configure a network using SNMP queries to incorporate location-based identification. The network 110 includes hosts 112, typically portable computers and in this illustration conventional laptop computers. The hosts in this example are located in individual hotel rooms, however the hosts could be located in other entities, such as apartment units, office rooms, airport kiosks or the like. The hosts access the network via a digital subscriber line (DSL) modem 114. Once a communication link is established the hosts send out standard IP data packets 116, to communicate data within the network. At the DSL modem a DSL header is attached to the packets, resulting in the DSL/Ethernet/IP packet 118. The packets are then routed through a connection point, shown in this example as punchdown block 120, before an access concentrator 122 receives them.

In this application, since the access concentrator does not implement VLAN tagging, the packets communicated between the access concentrator and the gateway device 124 are standard IP packets 126. The IP packets that are received by the gateway device are devoid of any information related to location (i.e. ports). As shown in FIG. 5, the gateway device must be configured to send out SNMP query packets 128 back to the access concentrator asking the concentrator from which port did this packet (i.e. this MAC address) come from. The access concentrator that is in communication with a database that ties MAC addresses to ports, is then able to reply to the query with an SNMP query response 136 that ties the MAC address of the packet to a port number. The access concentrator responds by sending an IP packet back to the gateway device identifying the port number. The gateway removes the port number and associated MAC address from the SNMP header and tables the information in an appropriate communications table database associated with the gateway device. In turn, the gateway device may use this location-based identification for billing purposes, such as the Hotel PMS system 130 shown in FIGS. 5 and 6, network authorization or any other network purpose. Once the database has proper port number to MAC address mapping for any specific location, the gateway device will no longer be required to send out SNMP queries to the access concentrator. In this manner, the SNMP query procedure is typically only required to be performed once for any given port. After the gateway device has logged the port related information into the database the packets are communicated forward to other networks, such as the Internet 132. In this instance the packets are communicated as standard IP packets 134.

It should be noted that in the SNMP query embodiment the gateway device and the access concentrator must be SNMP compatible. Both the gateway device and the access concentrator must be configured with the SNMP agent to receive, send and act upon SNMP queries. If other querying agents are used to implement location-based identification then both the gateway device or a similar network device and the access concentrator must be configured with the chosen querying agent.

Figure 6:
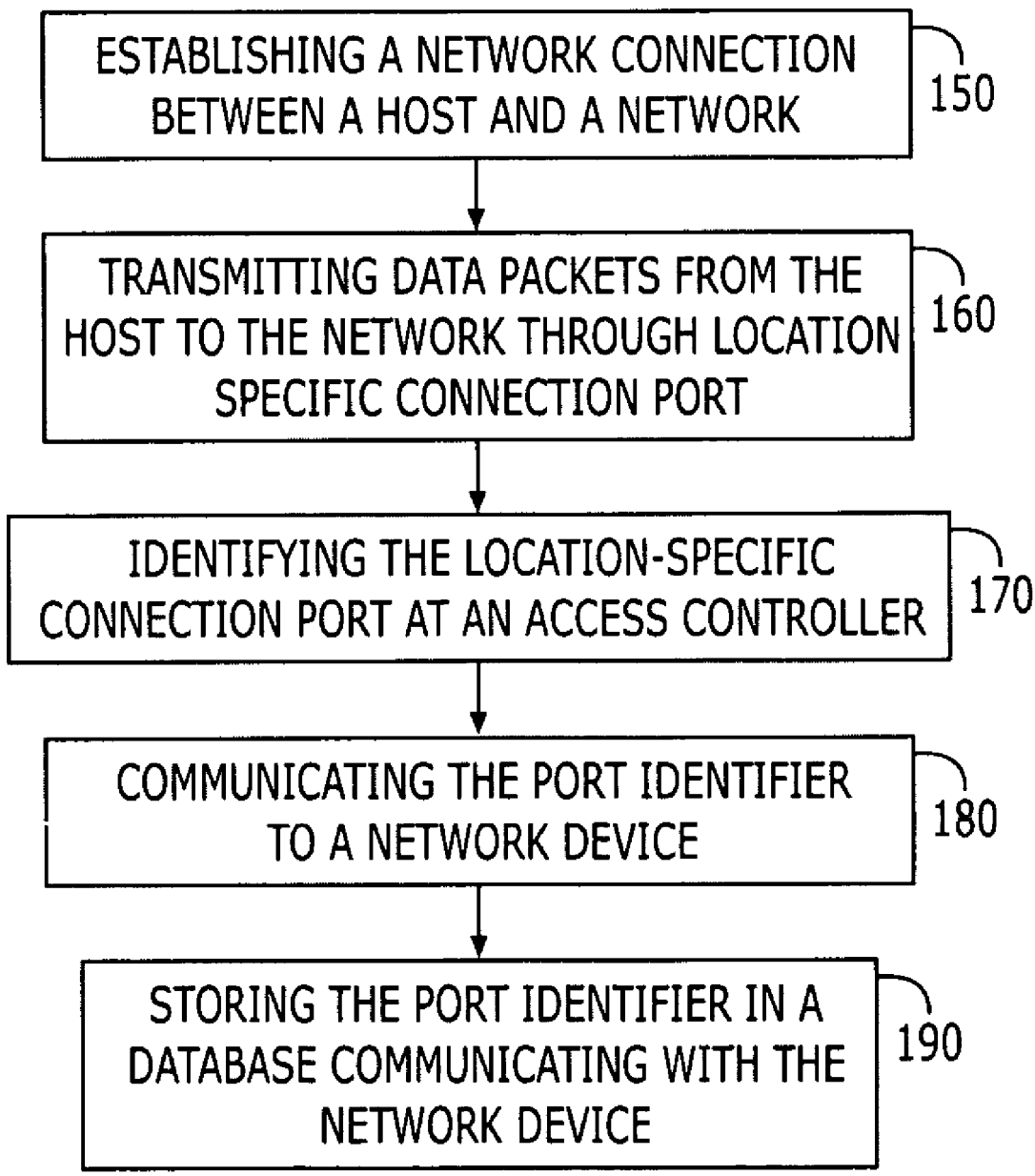
FIG. 6 is a flow diagram of a general method for location-based identification in a communication network, in accordance with an embodiment of the present invention.

In accordance with an embodiment of the present invention, a method for implementing location-based identification in a communication network is shown in the flow chart diagram of FIG. 6. At step 150, a network connection is established between a host and a network. The communication medium that may be used to establish the connection includes telephone line, DSL, conventional cable, CAT5 cable, wireless and the like. At step 160, data packets, typically IP data packets are transmitted from the host to the network through a location-specific connection port. The location-specific connection port is typically located in a hotel room, an airport kiosk, an apartment building or a similar remote locale. At step 170, the location-specific connection port is identified at an access concentrator. The identification process that occurs at the access concentrator may include VLAN tagging of the data packets, SNMP query responses or a similar identification process. Once the location-specific connection port has been identified in the form of a port identifier it is then, at step 180, communicated to a network device, typically a gateway device. The network device will either comprise or be in communication with a database that, at step 190, stores the port identifiers in order to identify the ports that have been authorized network access.

Figure 7:
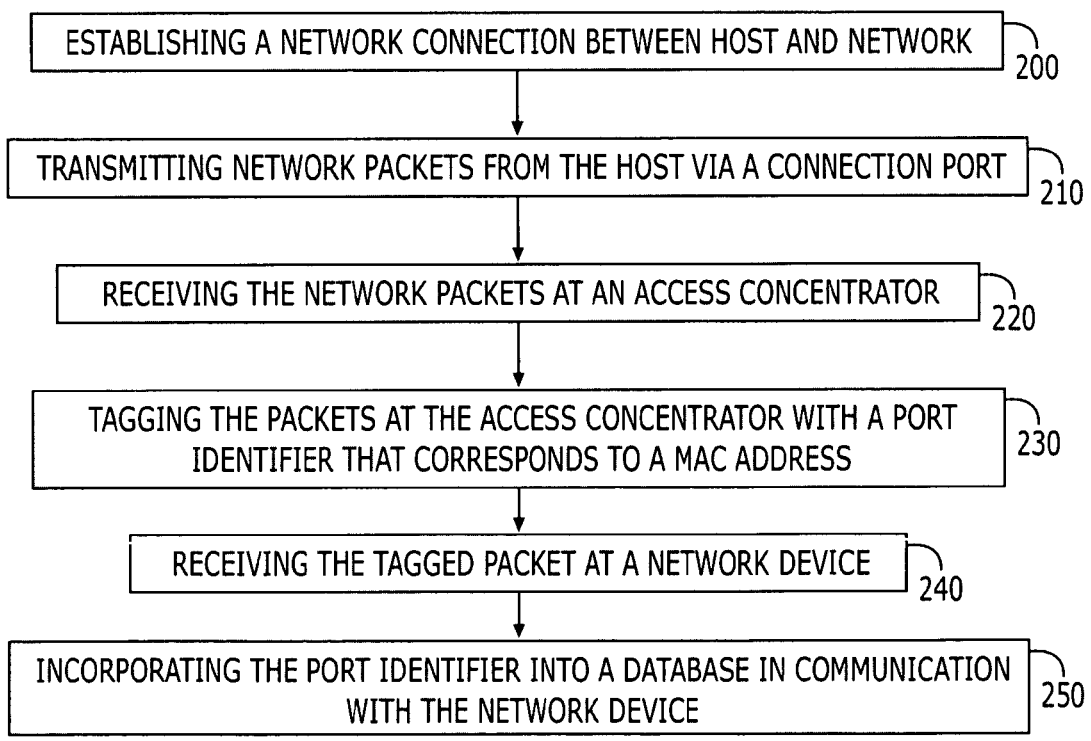
FIG. 7 is a flow diagram of a method for location-based identification in a communication network implementing VLAN tagging, in accordance with an embodiment of the present invention.

In accordance with another embodiment of the present invention, a method for location-based identification implementing VLAN tagging in a communication network is shown in the flow diagram of FIG. 7. At step 200, a network connection is established between a host and a network. The communication medium that may be used to establish the connection includes telephone line, DSL, conventional cable, CAT5 cable, wireless and the like. At step 210, the host sends network data packets to the network via a connection port and at step 220 the network data packets are received at an access concentrator. The access concentrator may comprise a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like. The access concentrator will be configured with an agent that allows for port identification. For example, an access concentrator may be configured with a VLAN agent that provides for VLAN tagging of the packets transmitted from a location-specific connection port.

At step 230, the access concentrator tags the network data packet with a port identifier that corresponds to the media access control (MAC) address. The tagging of the network data packet is typically performed using VLAN technology. Each port in the network service provider's entity is configured as a virtual LAN and therefore, each port has its own VLAN identifier. At step 240, the tagged data packet is received at a network device, typically a gateway device, where the port identifying information is removed from the packet header. At step 250 the port identifier is incorporated into a database that is in communication with the network device. Once the location-based data, in this instance the port identifier, is incorporated into the database it can be called upon for billing scheme purposes, authentication purposes or for any other use in overall network management systems.

Figure 8:
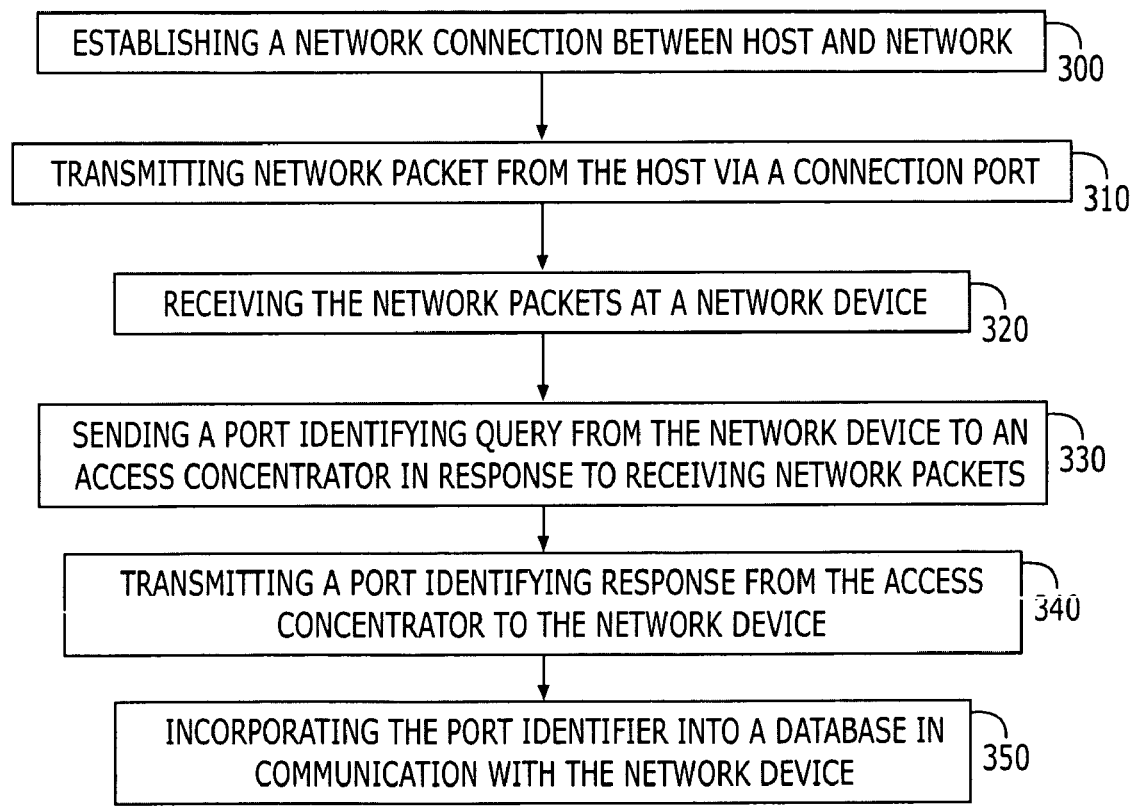
FIG. 8 is a flow diagram of a method for location-based identification in a communication network implementing SNMP querying, in accordance with an embodiment of the present invention.

In accordance with another embodiment of the present invention, a method for location-based identification implementing querying in a communication network is shown in the flow chart diagram of FIG. 8. At step 300, a network connection is established between a host and a network. The communication medium that may be used to establish the connection includes telephone line, DSL, conventional cable, CAT5 cable, wireless and the like. At step 310, the host sends network data packets to the network via a connection port and at step 320 the network packets are received at a network device, typically a gateway device.

The network device is typically configured with an agent that is capable of generating queries to other network devices. For example the network interface device may be configured with a SNMP agent that is capable of generating SNMP queries or another similar agent, such as XML, may be used. At step 330 the network device sends a port identifying query to an access concentrator, in response to receiving the network data packets. The access concentrator may comprise a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like. Characteristically, the access concentrator will have an agent capable of responding to the queries sent by the network interface device. For example, the access concentrator may be configured with a SNMP agent that is capable of generating SNMP responses, or another similar agent, such as XML, corresponding to the agent used in the network interface device may also be used. Additionally, the access concentrator is configured so as to track port identity versus MAC address of incoming packet traffic.

At step 340, the access concentrator sends a port identifying response back to the network device and at step 350 the port identifier is incorporated into a data base that is in communication with the network device. Once the location-based data, in this instance the port identifier, is incorporated into the database it can be called upon for billing schemes, authorization or for use in any other overall network management system.

The method and apparatus of the present invention provide for location-based identification of subscribers as opposed identifying subscribers based on the user or the device. In this manner the network system can administer billing schemes and network management (i.e. quality of service, billing maintenance, authorization, etc.) based upon the physical entity; the hotel room, the apartment unit, the airport kiosk, etc. where the user is located. This provides more options to the network service provider in terms of billing and network management.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way.

That which is claimed:

1. A network gateway device capable of providing location-based identification to network subscribers, comprising:

a processor that communicates with an access concentrator to receive a plurality of port identifiers assigned by the access concentrator wherein each port identifier is associated with a location-specific connection port that provides connection for one or more hosts, the processor further determines which of the location-specific connection ports are currently accessing the network by associating each of the received port identifiers with a location-specific connection port, and the processor further comprises a querying agent configured to request transmission of location information associated with the plurality of port identifiers from the associated access concentrator in response to a determination that a data packet has been received that fails to include location information; and a database associated with the network gateway device that stores the location-specific connection ports for the purpose of identifying one or more hosts associated with the connection port that have been granted network authorization.

2. The network gateway device of claim 1, wherein the processor uses VLAN protocol as a communication link between the processor and the access concentrator.

3. The network gateway device of claim 1, wherein the querying agent uses Simple Network Management Protocol (SNMP) as the communication link between the network gateway device and the access concentrator.

4. The network gateway device of claim 1, wherein the querying agent uses Extensible Markup Language (XML) as the communication link between the network gateway device and the access concentrator.

5. The network device of claim 1, wherein the database is configured to store a conditional state for each location-specific connection port.

6. A method for implementing location-based identification in a communications network, comprising the steps of:
- establishing network connections between a plurality of hosts and a network, wherein each host is connected to the network at a location-specific, connection port;
- transmitting data packets from each of the hosts;
- identifying the location-specific, connection port of each of the hosts at an access concentrator by assigning one of a plurality of port identifiers that is mapped to a location of the connection port;
- communicating the port identifier to a network gateway device by transmitting a port requesting query from the network gateway device in response to a determination that a data packet has been received that fails to include location information, and receiving a port identifying response at the network gateway device in response to the port requesting response that includes the location information;
- storing the port identifier in a database in communication with the network gateway device, the database maps the port identifier to one or more hosts associated with the connection port, and
- identifying, at the network gateway device, one or more hosts that have been granted network authorization based upon port identifiers that are currently stored in the database.

7. The method of claim 6, wherein identifying the location-specific, connection port of each of the hosts at an access concentrator further comprises tagging the data packets being sent from each host with one of a plurality of port identifiers at an access concentrator.

8. The method of claim 7, wherein communicating the port identifier to a network gateway device further comprises transmitting the tagged data packets to a network gateway device.

9. The method of claim 7, wherein tagging the data packets being sent from each host with one of a plurality of port identifiers further comprises tagging the data packets being sent from each host with one of a plurality of port identifiers that corresponds to a media access control (MAC) address.

10. The method of claim 7, wherein tagging the data packets being sent from each host with one of a plurality of port identifiers includes implementing the use of VLAN protocol.

11. The method of claim 6, wherein transmitting a port requesting query from the network gateway device further comprises transmitting a SNMP (Simple Network Management Protocol) query.

12. The method of claim 6, wherein transmitting a port requesting query from the network gateway device further comprises transmitting a XML (Extensible Markup Language) query.

13. The method of claim 6, wherein transmitting a port identifying response further comprises transmitting a port identifier that corresponds with a media access control (MAC) address.

14. The method of claim 6, further comprising storing a conditional state for each location-specific connection port in the database.

15. A method for using location-based identification in a communications network, comprising:
- accessing a database in communication with a network gateway device to identify one or more location-specific connection ports within a communications network that are currently mapped to a port identifier;
- transmitting a port requesting query from the network gateway device in response to a determination that a data packet has been received that fails to include location information;
- receiving a port identifying response at the network gateway device in response to the port requesting response that includes the location information; and
- applying results of the identification to a network system application.

16. The method of claim 15, further comprising executing the network system application at the network gateway device.

17. The method of claim 15, wherein applying results of the identification to a network system application further comprises applying the identified one or more location-specific connection ports to a network billing application that bills subscribers based on location.

18. The method of claim 15, wherein applying results of the identification to a network system application further comprises applying the identified one or more location-specific connection ports to an authorization application that provides authorization to network subscribers based on location.

19. The method of claim 15, wherein applying the results of the identification to a network system application further comprises applying the identified one or more of location-specific connection ports to determine port-specific information that will be communicated to a connection port.

20. The method of claim 15, further comprising storing a conditional state for each location-specific connection port in the database.

* * * * *

UNITED STATES PATENT AND TRADEMARK OFFICE
CERTIFICATE OF CORRECTION

PATENT NO. : 7,197,556 B1  Page 1 of 1
APPLICATION NO. : 09/693511
DATED : March 27, 2007
INVENTOR(S) : Short et al.

It is certified that error appears in the above-identified patent and that said Letters Patent is hereby corrected as shown below:

Col. 13, claim 6 line 36, please change "the port requesting response that includes" to -- the port requesting query that includes --.

Col. 14, claim 15 lines 32-33, please change "the port requesting response that includes" to -- the port requesting query that includes --.

Signed and Sealed this

Twenty-second Day of December, 2009

David J. Kappos
*Director of the United States Patent and Trademark Office*